United States Patent [19]

Hanlet

[11] Patent Number: 4,733,135

[45] Date of Patent: Mar. 22, 1988

[54] SELF-REGULATING, NO LOAD PROTECTED ELECTRONIC BALLAST SYSTEM

[75] Inventor: Jacques M. Hanlet, Loxahatchee, Fla.

[73] Assignee: Intent Patents A.G., Liechtenstein, Liechtenstein

[21] Appl. No.: 860,200

[22] Filed: May 6, 1986

Related U.S. Application Data

[63] Continuation-in-part of Ser. No. 580,624, Feb. 23, 1984, Pat. No. 4,587,461.

[51] Int. Cl.$^4$ .............................................. H05B 37/02
[52] U.S. Cl. ..................................... 315/224; 315/221; 315/278; 315/DIG. 7; 315/219
[58] Field of Search ......... 315/224, 221, 278, DIG. 7, 315/DIG. 4, 95, 219, 209 R, 205, 274, 297, 200 R

[56] References Cited

U.S. PATENT DOCUMENTS

| | | | |
|---|---|---|---|
| 3,222,572 | 12/1965 | Powell | 315/224 |
| 3,619,713 | 11/1971 | Biega | 315/224 |
| 3,638,070 | 1/1972 | Powell | 315/DIG. 4 |
| 3,878,431 | 4/1975 | Petrina | 315/DIG. 4 |
| 4,075,476 | 2/1978 | Pitel | 315/278 |
| 4,259,616 | 3/1981 | Smith | 315/278 |
| 4,277,726 | 7/1981 | Burke | 315/224 |
| 4,503,362 | 3/1985 | Hanlet | 315/224 |
| 4,587,461 | 5/1986 | Hanlet | 315/224 |

Primary Examiner—David K. Moore
Assistant Examiner—Michael Razavi

[57] ABSTRACT

A self-regulating, no load protected electronic ballast system (10) is provided which includes a power source (12) for actuating at least one gas discharge tube (66) with a regulated current and limited voltage to maintain the gas discharge tubes (66) input and output power at a predetermined value. The self-regulating, no load protected electronic ballast system (10) includes a filter circuit (11) coupled to the power source (12) with an induction circuit (15) coupled to the filter circuit (11). The induction circuit (15) has a tapped primary winding (42) providing an auto-transformer configuration for establishing the magnitude of the regulated current. The induction circuit (15) includes a trigger control winding (48) for generating a control current and further includes a no-load protection circuit (99) for generating a voltage across the gas discharge tube (66) responsive to the regulated current and for maintaining the output voltage at a predetermined value when the gas discharge tube (66) is decoupled from the electronic ballast system (10). In this manner, the output voltage of the ballast system (10) is substantially reduced when the gas discharge tube (66) is electrically decoupled from the overall circuit resulting in a higher reliability and extended life of a particular gas discharge tube (66).

32 Claims, 1 Drawing Figure

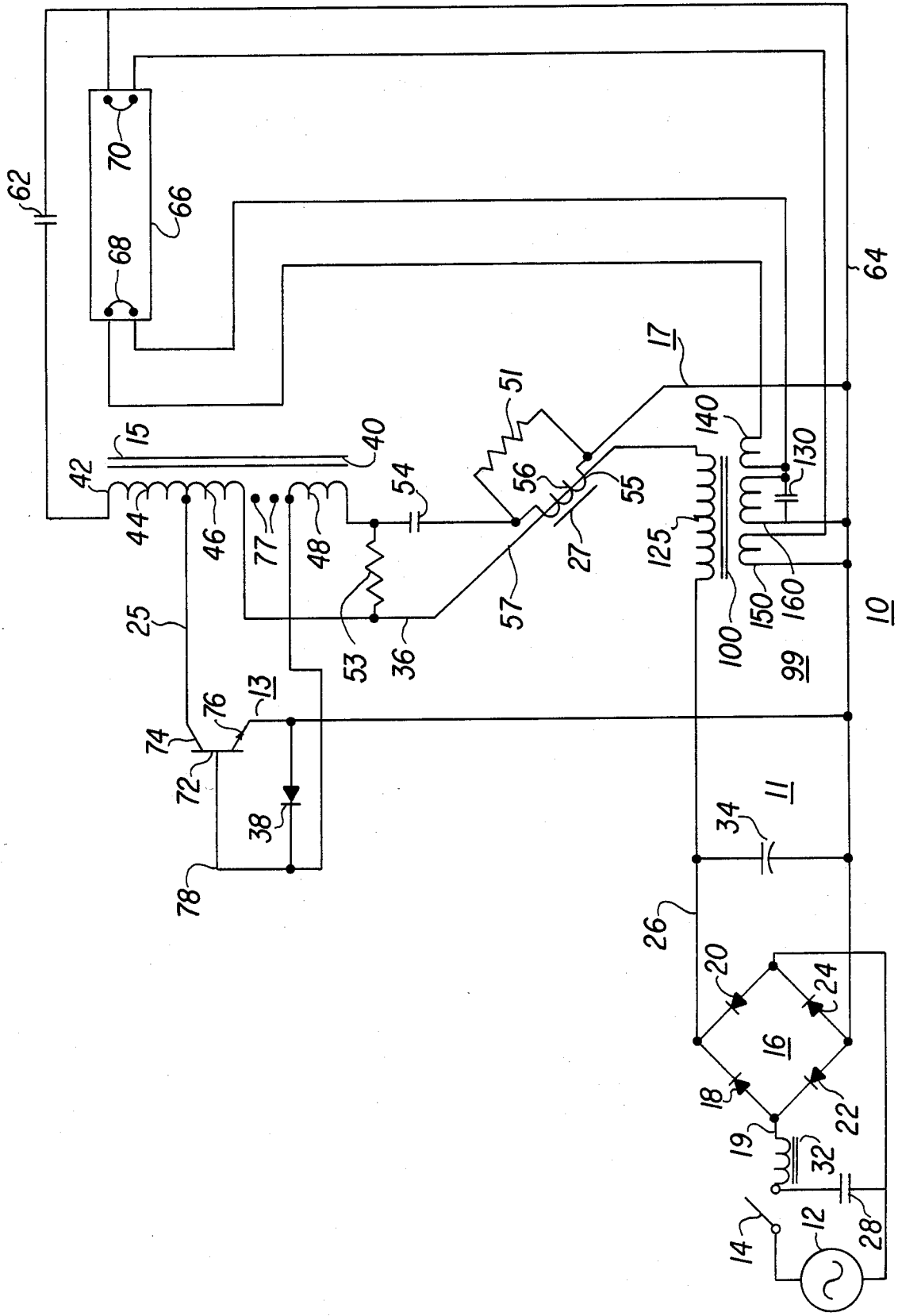

SELF-REGULATING, NO LOAD PROTECTED ELECTRONIC BALLAST SYSTEM

REFERENCE TO RELATED APPLICATIONS

This electronic ballast system is a Continuation-in-Part of U.S. patent application Ser. No. 580,624, filed 23 Feb. 1984, and entitled "Self-Regulating Electronic Ballast System", now U.S. Pat. No. 4,587,461.

BACKGROUND OF THE INVENTION

1. Field of the Invention

This invention is directed to an electronic ballast system for fluorescent or gas discharge tubes. In particular, this invention relates to automatic gain controlled ballast systems for fluorescent tubes. Still further, this invention relates to an electronic ballast system which limits the voltage output to fluorescent or gas discharge tubes when the output voltage of the power source increases. This invention limits the output voltage of the electronic ballast system and substantially reduces such when the gas discharge tube or fluorescent tube is electrically removed from the overall circuit. More in particular, this invention pertains to a no load protection transformer being series coupled to an induction circuit for preventing the generation of voltages above a predetermined value when the gas discharge or fluorescent tube is electrically removed from the circuit. More in particular, this invention relates to an electronic ballast system where a primary winding of a no load protection transformer forms a variable inductance which is inversely proportional to the magnitude of power delivered to the gas discharge or fluorescent tube.

Still further, this invention directs itself to a transistor switching mechanism which is feedback coupled to an induction circuit for establishing a regulated current for a gas discharge tube independent of the gain of a transistor used in a particular ballast system unit. Additionally, this invention pertains to an electronic ballast system where there is provided a transistor switching network including a regulation control circuit for maintaining the power output of a gas discharge or fluorescent tube at a predetermined and substantially constant value.

Further, this invention directs itself to an electronic ballast system having a toroidal transformer to provide a predetermined variable inductance for regulating a power output to the gas discharge or fluorescent tube. Still further, this invention relates to an electronic ballast system which is transistorized and where the current gain of various transistors range over a wide value range from one system unit to another and provides for electrical circuitry which will maintain the gas discharge tube light output fluctuation to a minimum tolerance value.

2. Prior Art

Electronic ballast systems for gas discharge or fluorescent tubes are known in the art. However, in some prior art electronic ballast systems, removal of the gas discharge or fluorescent tube from the ballast circuit causes excessive voltage outputs to the gas discharge or fluorescent tubes. This condition can have a deleterious effect to the operating life of the particular tube or set of tubes utilized in a particular ballast system.

Other prior art systems do not provide for a no load protection transformer being coupled to an induction circuit of such electronic ballast systems for preventing the generation of voltages above predetermined values when the gas discharge or fluorescent tubes are electrically decoupled from the ballast circuit. Such prior art systems do not have the capability of providing a variable inductance which is inversely proportional to the magnitude of the power delivered to the gas discharge or fluorescent tubes. Thus, such prior art systems do not allow a limited voltage to be generated by control of the collector current of the ballast transistor responsive to load conditions, as is seen in the subject invention concept.

In other prior art electronic ballast systems, the light output of the gas discharge tubes are highly dependent upon the gain of the transistors used in the circuits. In such prior art systems, where the transistor gains between one unit and another vary over a large value, the light output from the gas discharge tube may fluctuate by excessive amounts. In such prior art systems, additional circuitry must be added to such electronic ballast systems to maintain the light output fluctuation as constant as possible between differing units.

SUMMARY OF THE INVENTION

A self-regulating, no load protected electronic ballast system having a power source for actuating at least one gas discharge tube with a regulated current and limited voltage to maintain the gas discharge tube input and output power at predetermined values. The electronic ballast system includes a filter circuit connected to the power source for (1) maintaining a substantially smooth direct current voltage signal, and (2) suppressing harmonic frequencies generated by the electronic ballast system. Additionally, the self-regulating, no load protected electronic ballast system includes induction circuitry coupled to the filter circuit having a tapped primary winding providing an auto-transformer configuration for establishing the frequency of the regulated current. The induction circuit includes a trigger control winding for generating a controlled current and further includes a no-load protection circuit for generating a voltage across the gas discharge tube responsive to the regulated current and for maintaining the output voltage at a predetermined value when the gas discharge tube is decoupled from the electronic ballast system. Switching circuitry is feedback coupled to the induction circuit for establishing the regulated current. The switching circuit includes regulation circuitry for maintaining the power output of the gas discharge tube at a predetermined and substantially constant value. The regulation circuit includes a toroidal transformer having (1) a first winding coupled in series relation with the trigger control winding and the switching circuitry for modifying the control current, and, (2) a second winding coupled to the tapped primary winding of the induction circuit and the filter circuit in series relation for feedback to the first winding of the toroidal transformer.

BRIEF DESCRIPTION OF THE DRAWINGS

The FIGURE is an electrical schematic diagram of the self-regulating, no load protected electronic ballast system.

DESCRIPTION OF THE PREFERRED EMBODIMENTS

Referring to the Figure, there is shown self-regulating, no load protected electronic ballast system 10 having power source 12 for actuation of at least one gas discharge tube 66. Gas discharge tube 66 may be a standard fluorescent type system having first and second filaments 68 and 70, respectively. Self-regulating, no load protected electronic ballast system 10 is provided to maintain the output and input power of gas discharge tube 66 at a substantially predetermined value which is relatively constant during operation and substantially constant and independent of electrical component tolerances from one electronic ballast system 10 to another.

In overall concept, self-regulating, no load protected electronic ballast system 10 is provided for maximization of efficiency of light output from gas discharge tube 66 with respect to a power input from power source 12. Additionally, self-regulating, no load protected electronic ballast system 10 provides for a substantially constant light output in the order of approximately ±3.0%, regardless of the voltage variation by virtue of the output of gas discharge tube 66 being responsive to a square wave form of pulsating driving current as opposed to a square wave form of pulsating input voltage.

Further, self-regulating, no load protected electronic ballast system 10 limits the voltage output to gas discharge tube 66 to prevent excessive high voltage when the output voltage of power source 12 increases. As will be seen in following paragraphs, output voltage of electronic ballast system 10 is limited and substantially reduced when gas discharge tube 66 is electrically removed from the circuit.

Of importance, electronic ballast system 10 provides initially for a regulation control which eliminates the need for adjusting or pre-selecting transistors of specific gain, in order to provide a relatively constant light output substantially independent of manufacturing tolerances associated with the manufacture of contained electronic components. Secondly, it provides for a voltage limiting control which limits the maximum output voltage to gas discharge tube 66 in response to voltage increases from power source 12. The output voltage is reduced below its normal operating voltage when the gas discharge tube 66 is electrically removed from the circuit, either by its failure or by its physical removal from the system.

Additionally, self-regulating, no load protected electronic ballast system 10 provides for a frequency control mechanism using the inductive characteristics of inverter transformer 40 and the tank circuit formed by the secondary winding 160 of transformer 100 and capacitor 130 allowing for frequency stabilization and having the advantage of permitting electronic ballast system 10 to operate in a normal manner without bothersome visual flickering.

Particularly, operation of gas discharge tube 66 is maintained at a minimum level due to the higher efficiency obtained by self-regulating, no load protected electronic ballast system 10. Of importance to the reliability of system 10 is the minimization of electrical components coupled with the simplicity of the circuitry associated with ballast system 10. This concatenation of elements has the effect of increasing reliability of self-regulating, no load protected electronic ballast system 10 while simultaneously maximizing the operating lifetime of gas discharge tube 66.

Referring now to the Figure of electronic ballast system 10, having a power source 12 for actuating gas discharge tube 66, such includes filter circuit 11 coupled to power source 12 for establishing a substantially direct current voltage signal and suppressing harmonic frequencies generated by electronic ballast system 10.

In still further overall concept, self-regulating, no load protected electronic ballast system 10 includes induction circuitry 15 which is electrically coupled to filter circuit 11 for establishing the magnitude of a pulsating driving current established by switching network 13. As will be detailed in following paragraphs, induction circuitry 15 includes no load protection circuit 99 for generating a voltage across gas discharge tube 66 responsive to the pulsating driving current, and for maintaining the output voltage at a predetermined value when gas discharge tube 66 is not electrically connected to ballast system 10. Induction circuit 15 is coupled to regulation control circuit 17 for maintaining a gain value of switching network 13 to a predetermined level. Thus, filter circuit 11 is connected to power source 12 for (1) maintaining a substantially smooth direct current voltage signal; and, (2) suppressing harmonic frequencies generated by electronic ballast system 10.

Induction circuitry 15 also includes base drive winding 48 for generating a switching signal. Switching network 13 generates a pulsating driving current responsive to the switching signals generated in base driving winding 48.

As will be further described, no load protection circuit 99 is coupled to filter circuit 11 and includes a tuned high voltage output secondary winding 160 for generating a limited voltage across gas discharge tube 66 responsive to the regulated driving current.

Referring further to the Figure, there is shown power source 12 to provide an electrical power input for self-regulating, no load protected electronic ballast system 10. In the embodiment shown in the Figure, power source 12 may be an AC power source of standard voltage such as 120, 240, 270 volts, or any acceptable standardized power voltage generated at approximately 50.0 or 60.0 Hz. In broad general concept, power source 12 may be a DC power electrical source applied internal or external to self-regulating, no load protected electronic ballast system 10 in a manner well-known in the art by removal of some elemental circuitry and filtering elements.

For the purposes of illustration, power source 12 will be in the following paragraphs designated as a 210–240 volt, 50.0 Hz., AC power source, and will be used in the embodiment to be described.

Power for system 10 is supplied by power source 12 to switch 14 which may be a standard switch element such as a single pole, single throw switch mechanism. Power is applied from switch element 14 to choke 32 and harmonic filter capacitor 28. Harmonic filter capacitor 28 is coupled in parallel relationship with power source 12 and is designed to shunt high frequency components which would be fed back from electronic ballast system 10 to the power source 12. Choke element 32 is coupled in series relation with power source 12 and rectification circuit 16, which is used for providing full-wave rectification of the power source AC voltage.

Rectification circuit 16 may be a full-wave bridge circuit well-known and standard in the art. In the embodiment illustrated, full wave bridge circuit 16 is formed of diode elements 18, 20, 22, and 24 for providing the necessary rectification of AC voltage from power source 12. Diode elements 18, 20, 22 and 24 may be one of a number of standard diode elements, and in one form of self-regulating, no load protected electronic ballast system 10, diode elements 18, 20, 22 and 24 have a standardized designation of 1N4005.

Rectification by full wave bridge circuit 16 provides a pulsating DC voltage signal passing on output line 26 which is applied to shunt capacitor 34 of filter network 11. Filter network 11 filters the voltages input and output from rectification circuit 16, and is electrically connected to bridge circuit 16 by input line 19 and output line 26. Rectification bridge circuit 16 is coupled to return line 64 which is the return path for the DC supply for the opposing ends of bridge circuit 16, providing DC power input to shunt capacitor 34 of filter network 11.

The smoothing filter portion of filter network 11 includes choke element 32 and shunt capacitor 34. Choke element 32 is coupled on a first end to power source 12 and on a second end to rectification circuit 16 through input line 19. As is seen, shunt capacitor 34 is coupled in parallel relation with the output of rectification circuit 16 through output line 26. Shunt capacitor 34 is connected on a first end to rectification circuit 16 output line 26 and coupled on opposing end to DC return line 64.

In combination, shunt capacitor 34 and choke element 32 function to average out the 100 Hz pulsating DC voltage supplied by full wave bridge circuit 16. Additionally, this combination substantially maintains the current draw at an average value without creating a power factor which is either unacceptably leading, or unacceptably lagging. Deleterious lead or lag may be found wherein a large capacitance is used, or a large inductance, as the sole filtering means for smoothing a pulsating DC voltage.

For purposes of illustration, in the event choke element 32 were not incorporated within self-regulating, no load protected electronic ballast system 10, shunt capacitor 34 would draw an increase current commonly referred to as a surge current on each cycle as capacitor 34 began to charge. By incorporation of choke element 32, the inductance stores energy during each half-cycle to supply current for initial charging of shunt capacitor 34 which provides a substantially smooth, average current as seen by power source 12.

In the embodiment herein provided, choke element 32 may be an inductor approximately 2.0 Henries, with a resistance of less than 40.0 Ohms, and shunt capacitor 34 is a commonly available 100.0 microfarad, 250.0 volt electrolytic capacitor.

Filter network 11 includes harmonic filter capacitor 28 which in combination with choke element 32 substantially reduces harmonic frequencies generated by induction circuit 15. The tuning of harmonic filter capacitor 28 in combination with choke element 32 has been designed to provide significant reduction in amplitude of at least the first five harmonic frequencies coupled from the DC supply of ballast system 10. As is typical in filters of this nature, harmonic freqencies which are multiples of these first five harmonic frequencies are also reduced.

In the embodiment herein provided, harmonic filter capacitor 28 is approximately a 1.5 microfarad, 400.0 volt Mylar type capacitor, which is coupled in parallel relation with power source 12 and bridge circuit 16 through choke element 32.

No load protection circuitry 99 is coupled between filter network 11 and induction circuit 15. No load protection circuit 99 includes transformer 100, with primary winding 125 and tuned high voltage output secondary winding 160 as well as a pair of filament excitation windings 140 and 150. Tuned, high voltage output secondary winding 160 is coupled in parallel relation with tuning capacitor 130 to form a tank circuit for generating the output voltage to gas discharge tube 66. Filament excitation windings 150 and 140 are coupled to gas discharge tube 66 filaments 70 and 68, respectively.

In the embodiment herein provided, no load protection circuit 99 is comprised of transformer 100 with the core material being a ferrite composition having the designation of Ferroxcube 2616 with primary winding 125 composed of 29 turns, and tuned high voltage output secondary winding having 50 turns and each of filament excitation windings 140 and 150 being composed of a single turn each. Transformer 100 has a linear magnetic core and does not saturate. Tuning capacitor 130 is a ten nanofarad capacitor.

Self-regulation control circuit 17 is coupled between no load protection circuit 99 and inverter network 15. Self-regulation control circuit 17 includes first capacitor 54, toroid transformer 56, and shunt resistor 51. Shunt resistor 51 is coupled in parallel relation with first winding 55 of toroid transformer 56. First winding 55 of toroid transformer 56 besides being parallel coupled to shunt resistor 51 is coupled on a first end to return line 64 and on a second end to base coupling capacitor 54. Base coupling capacitor 54 is coupled on one end to first winding 55 of toroid transformer 56 and on the opposing end to base drive winding 48 of induction circuit 15.

Although not important to the inventive concept as herein described, shunt resistor 51 may have a value of approximately 200 Ohms. Toroid transformer 56 may have a ferrite core material composition which is a Ferroxcube designated 3B7-266T125, or 3B7-266CT125, with first winding 55 having 12 turns of number 28 wire, and a second winding 57 of a single turn formed by DC power input or filter output line 36 passing through the axis of the toroid core. Base coupling capacitor 54 may be a 0.22 microfarad, 100 volt Mylar type capacitor.

The series combination of first winding 55 of toroid transformer 56, and base coupling capacitor 54 provides for return paths for the base drive signal of switching network 13 subsequent to self-regulating, no load protected electronic ballast system 10 going into an oscillation phase.

Self-regulating, no load protected electronic ballast system 10 further includes switching network 13 which is feedback coupled to induction circuitry 15 for establishment of a pulsated current. As will be seen in following paragraphs, switching network 13 includes a regulation mechanism for maintaining the power output of gas discharge tube 66 at a predetermined and subsequently constant value.

Switching network 13 includes transistor 72 connected in feedback relation to bias or trigger control winding 48 of inverter transformer 40. This coupling allows switching of a current signal responsive to a bias signal produced. Referring to bias control winding 48 of inverter transformer 40, current entering the first end of bias control winding 48 passes through winding 48 to base element 78 of transistor 72. Transistor 72 includes respectively base element 78, collector element 74, and emitter element 76. Transistor 72 may be of an NPN type which is commercially available and in one commercially purchased transistor, has a designation of MJE13005 or MJE16002.

It is to be understood that self-regulating, no load protected electronic ballast system 10 is designed to provide a consistency in visual light output, as well as power input to gas discharge tube 66 by maintaining the current of collector element 74 substantially constant independent of the current gain of a particular transistor 72 used in electronic ballast system 10.

It has been determined that the light output should not fluctuate more than ±3.0% while the current gain of transistor 72 used in system 10 may vary in the extreme between 10 and 60. It is to be further understood that although system 10 as shown in the illustrated embodiment operates a single gas discharge tube 66, the principle as herein described is general in concept and may be used in dual systems, since in such cases, transistor current gains would not necessarily have to be matched by pairs.

Initially, a positive voltage provided to base element 78 by resistor 53 assures a small but sufficiently initiating current flow through base element 78 for initiation of conduction through transistor 72. A value of 1.0 megohms has been used successfully for resistor 53.

When transistor 72 goes into a conducting or "on" state, current from power source 12 flows through choke 32, bridge circuit 16 and primary winding 125 of transformer 100 to DC output line 36. DC output line 36 is coupled to primary winding 42 of inverter transformer 40 and passes through the axis of the core of toroidal transformer 56. Such current passes through first section 46 of primary winding 42 to tap line 25 which is coupled to collector element 74 of switching transistor 72.

Current flows through transistor 72 from collector 74 to emitter 76 and then from emitter element 76 through return line 64. The increase in collector current established by switching transistor 72 induces a voltage in bias control winding 48 which is coupled to base element 78 of transistor 72. Base current flows from base element 78 to emitter element 76 in transistor 72 and from emitter element 78 to return line 64.

In completion of the circuit, the current flows through first winding 55 of toroid transformer 56, and base coupling capacitor 54. The series combination of elements as aforementioned, creates a pulse type base drive for switching transistor 72 from an "on" state to an "off" state after a predetermined period of time.

The pulse which drives switching transistor 72 controls the duration of the "on" time during the frequency of operation of self-regulating, no load protected electronic ballast system 10. At the terminating point of this pulse, transistor 72 goes to an "off" state and the pulse differentiation through capacitor 54 supplies a negative signal to base element 78 which is limited in value magnitude by diode 38. The energy stored in inverter transformer 40 is discharged from primary winding 42 to capacitor 62 and therethrough to return line 64.

Concurrently, as the collector current passes through the primary winding 125 of transformer 100, a voltage is induced in each of transformer 100 secondary windings. The voltage induced in filament excitation windings 140 and 150 causes a current flow through filaments 68 and 70 respectively of gas discharge tube 66.

The voltage induced in tuned high voltage output secondary winding 160 is coupled across tuning capacitor 130 and gas discharge tube 66. The voltage induced at this point in the cycle is sufficient to maintain the discharge within gas discharge tube 66 but not sufficient to initiate the discharge itself.

Reiterating, transistor 72 is initially switched to an "on" state by the small current flowing from output line 36, through resistor 53, base drive winding 48 to base 78 of transistor 72. This provides a current flow from output line 36 through first section 46 of primary winding 42, line 25, collector 74, emitter 76 and then to return line 64.

Due to the aforementioned, the magnetic field in the ferrite magnetic core of transformer 40 increases from substantially zero to a predetermined value of magnetic induction, B, on the hysteresis cycle in a manner such that the circuit operates in a linear region of the characteristic. The change in the magnetic field induces a voltage in the windings surrounding the magnetic core of transformer 40 proportional to the number of turns of a particular winding. The windings are coupled in a manner to enhance the positive voltage applied to the base 78 which increases the current flow in the loop comprising collector 74, emitter 76 and all elements in series coupling therewith, until the current reaches a maximum value determined by the impedance of first section 46 and the voltage level on line 36.

When the current in the path of collector 74 and emitter 76 ceases to increase, the magnetic induction having reached the predetermined value B abruptly collapses and induces a voltage of opposite polarity in base drive winding 48, which terminates the flow through collector 74 and emitter 76.

At this time, the induced voltages are large and classically are equal to the inductance sum multiplied by the differential of the current flowing with respect to time. The inductance sum is the sum of the inductances of transformer primary winding 125, first section 46, primary winding second section 44 and twice the mutual inductance between sections 46 and 44 which results in a frequency of discharge equal to one over 2 times the square root of the sum of the inductances multiplied by the capacitance of capacitor 62.

The discharge current assumes a sinusoidal shape dependent on the inverse of the frequency of discharge which is the "off" time and is the time taken to discharge the energy stored during the "on" time, namely one-half the inductance sum multiplied by the current squared. Once again, an abrupt fall in the magnetic induction is provided with the direction of the current opposite in direction to that portion of the sine wave. The substantially instantaneous voltages and currents are large enough to induce the starting voltages either positive or negative in winding 160.

The magnitude of the voltage across winding 160 of transformer 100 is equal to the mutual inductance between primary winding 125 and winding 160 multiplied by the current flow through the winding 125 and 2 times the discharge frequency.

It is to be understood that the electromotive forces across windings 125 and 160 of transformer 100 are opposite in phase and current flowing in windings 140, 150 as well as 160 are such that it opposes changes in magnetic flux in primary winding 125. This has the effect of reducing the impedance of primary winding 125 and allows a larger current to flow in the loop inducing such. Thus when a current flows in any secondary winding, the current in primary winding 125 increases. When discharge tube 66 is removed from the circuit, there is no current flow in windings 140, 150 or 160 and the impedance of primary winding 125 increases which substantially reduces the current flow in the circuit loop including primary winding 125, first section 46 and transistor 72.

Switching network 13 further includes switching diode 38 which is coupled in parallel relation to the base emitter junction of transistor 72 and as is seen, the polarity of switching diode 38 is provided to prevent negative voltage from damaging transistor 72. Switching diode 38 may be a commercially available 1N4005 type and is connected such that its polarity is opposite to that formed by the base-emitter junction of transistor 72.

Primary winding 42 of inverter transformer 40 is a tapped winding which is connected in an autotransformer configuration such that the voltage induced in primary winding second section 44 is coupled in series relation and adds to the voltage across primary winding first section 46.

The total voltage across primary winding 42 is coupled to capacitor 62 which is connected in series relation with primary winding 42. Obviously, as seen in the Figure, capacitor 62 is coupled on a first end to primary winding 42 of inverter transformer 40 and is further coupled on a second end to return line 64. For purposes of the embodiment herein described, capacitor 62 may be a 3.5 nanofarad, 1.0 kilovolt Mylar capacitor, for discharge during transistor 72 "off" cycle of energy stored in inverter transformer 40 during transistor 72 "on" cycle.

Primary winding 125 of no load protection transformer 100, as previously described, is one element in the series combination of elements through which the transistors 72 collector current flows. Thus, the magnitude of the current in each of those elements is identical and the maximum value for that current is equal to the DC supply voltage on output line 36 divided by the sum of the series impedances in the current path.

The impedance of primary winding 125 of transformer 100 is a function of the impedance of the winding itself and the impedance which is reflected from the secondary windings. When the tuned high voltage output secondary winding 160 is loaded, the resulting impedance of primary winding 125 is at a minimum value. The filament excitation windings 140 and 150 have a negligible effect on the reflected impedance, since each is composed of only one turn. With the impedance of primary winding 125 at its minimum value, the collector current is therefore at its maximum, assuming the DC supply voltage on line 36 is at its designed value.

When the gas discharge tube 66 is no longer connected to electronic ballast system 10, the resulting reflected impedance of tuned high voltage secondary winding 160 in the primary winding 125 becomes very high. The now high series impedance of primary winding 125 causes the collector current to be proportionally reduced. Thus, the energy stored in transformer 100 is likewise proportionately reduced and the resulting voltage across the output terminals of winding 160 will be reduced as well.

Primary winding 125 of no load protection transformer 100 therefore functions as a variable impedance which is inversely proportional to the load seen on the secondary winding 160 of transformer 100. Since the impedance of primary winding 125 is substantially all inductive, there is very little dissipation in the form of heat in primary winding 125 to effect the efficiency or component life of electronic ballast system 10.

Referring still to the Figure of self-regulating, no load protected electronic ballast system 10, it is seen that when this system is in oscillation and transistor 72 is in an "on" state, the collector current which is the system driving current flows from power source 12 through filter network 11 including rectification circuit 16, through primary winding 125 of transformer 100 via line 26 to line 36. DC power output line 36 passes through the axis of toroidal transformer 56 and is coupled to one end of primary winding 42 of inverter transformer 40.

The driving current flows through first section 46 of primary winding 42 to tap line 25 where it is coupled to collector element 74 of switching transistor 72. Transistor 72 being in an "on" state allows current to pass from collector element 74 to emitter element 76 and back to the return of the power supply through line 64. This current being of an increasing nature, induces a voltage in bias control winding 48 which is wound in a direction to produce a voltage on base element 78 of transistor 72 which is positive with respect to emitter element 76 and greater than approximately 0.7 volts which is required to keep transistor 72 in an "on" state, thus, the voltage produced in bias control winding 48 reinforces the "on" condition of transistor 72.

The collector current increases in a substantially linear manner until a maximum value is reached. The maximum value is a function of the power supply voltage and the impedance of the collector circuit. Thus, when the collector current flows through first section 46 of primary winding 42, during the transistor "on" state, a magnetic flux is generated within the core of inverter transformer 40 which induces the voltage in secondary winding 48 reinforcing the "on" condition and provides the base drive current. The same driving current also flowing through primary winding 125 of transformer 100 generates a magnetic flux within the core of transformer 100 which induces the voltages in all of the secondary windings of no load protection transformer 100.

The induced voltages in secondary windings 140 and 150 provide the heater current for respective filaments 68 and 70 of gas discharge tube 66. The voltage induced in tuned high voltage output secondary winding 160 is coupled to tuning capacitor 130 and gas discharge tube 66 for generation of visible light output from gas discharge tube 66.

The induced voltage in second section 44 of primary winding 42 of inverter transformer 40 being monopolar only charges capacitor 62 during this portion of the cycle.

When transistor 72 is turned to an "off" state, the collector current which was flowing through first section 46 of inverter transformer primary winding 42 and primary winding 125 of no load protection transformer 100 terminates abruptly. The rapid change in collector current induces voltages again in second section 44 of inverter transformer primary winding 42 and secondary winding 48 as well as secondary windings 150, 140 and 160 of transformer 100. As is known from classical theory, the polarity of the voltages induced by the rapid collapse of the collector current is such that transformer 40 and transformer 100 attempt to maintain the direction of the original current in the respective primary windings 46 and 125. Due to the direction of current flow in windings 46 and 48 as indicated by nomenclature dots 77, the voltage induced in bias control winding 48 of inverter transformer 40 is of the opposite polarity as previously described when the collector current was flowing. Thus, a negative signal on base element 78 with respect to emitter 76 is generated and transistor 72 is switched to an "off" condition.

As has been described in previous paragraphs, this allows for a repetitive cycle with a collector current waveform which ideally would be a square wave. However, due to the gap in the magnetic circuit, such slows down changes in the value of B with respect to current and results in an inclined rectangularly shaped loop.

The frequency oscillation is determined by the time period for the transistor "on" coupled with the time period for the transistor "off" cycles. The time period for the "on" period is determined by the characteristics of the core of transformer 40, the number of turns of first section 46 of primary winding 42, and the current flowing through first section 46 of primary winding 42. In particular, the "on" time is equal to twice the value of B times the transformer turns times the core area divided by the voltage on output line 36, all being multiplied by $10^{-8}$. The time period for the "off" cycle of transistor 72 is controlled by the resonant frequency of the inductance of secondary winding 160 of transformer 100 and the capacitance value of capacitor 130.

Thus, the frequency of oscillation is controlled by the sum of the time periods for the "on" and "off" cycles and thus, the oscillation frequency is much less dependent on supply voltage than that which is known in the prior art and produces a visible light output from gas discharge tube 66 which is substantially constant and having a minimization of visual flicker, even when there exists substantially large variations in supply voltage.

As was previously described, when gas discharge tube 66 is electrically removed from the circuit, the driving current is reduced to limit the high voltage output from electronic ballast system 10. The reduced load seen by tuned high voltage output secondary winding 160 is reflected as an increase in impedance of primary winding 125 of transformer 100, which in turn reduces the collector current and the resulting induced voltages during each of the half cycles of the electronic ballast system 10 operation.

In one working and operable embodiment of self-regulating, no load protection electronic ballast system 10 inverter transformer 40 has a ferrite core using ferroxcube 3C8-3019 with a 0.24 millimeter gap to reduce the likelihood that inverter transformer 40 will go into a saturating mode. Primary winding 42 is formed of 104.5 turns of number 24 wire, and secondary winding 48 is composed of a single turn of number 24 wire.

It is of importance to maintain a relatively uniform gain of transistors used in self-regulating, no load protected electronic ballast system 10 such that light output may be relatively consistent from one particular unit to another within a range of approximately ±3.0%.

However, due to normal manufacturing techniques known in the industry, the gain of transistors 72 may vary between 10.0–50.0 or greater. Thus, a self-regulation control is a requirement as an advantage over having to manually adjust gain control elements or in the alternative, to preselect devices within a small tolerance in order to obtain an output of light which is relatively constant from one electronic ballast system 10 to another.

Self-regulating, no load protected electronic ballast system 10 makes use of the concept of a variable inductance in the form of toroidal core 27 wound with 12 turns in which the base current passes. Line 36 passes through the axis the toroidal core 27 which carries the collector current of transistor 72. The direction in which current flows through the two windings is such that the respective magnetic fields are additive within toroidal core 27 of toroidal transformer 56.

Therefore, the inductance which is seen in first winding 55 of toroidal transformer 56 is a function of both the base current and the collector current multiplied by the respective turn ratios and the permeability of magnetic core 27.

In actual practice, the inductance variations of second winding 57 of toroidal transformer 56 may be neglected since second winding 57 is formed of only a single turn and winding 57 inductance is relatively low as well as coupled in series with the inductance of first section 46 of primary winding 42. The inductance of second winding 57 has been found not to be significant when compared with the inductance of first section 46 of primary winding 42 which is substantially larger in absolute value.

In order to insure oscillation within self-regulating, no load protected electronic ballast system 10 of switching transistor 72, bias control winding 48 is specifically designed to supply sufficient voltage to turn "on" transistor 72 of the lowest gain which may be expected to be obtained from a manufacturer of these systems. In this manner, it is assured that transistor 72 will go to an "on" state and reach saturation and thus, the base to emitter voltage will be at least 0.7 volts required to switch transistor 72 to the saturation state.

Regardless of the gain of transistor 72 used in self-regulating, no load protected electronic ballast system 10, the collector voltage and collector circuit impedance is substantially the same and thus, the substantially same collector current will flow whether a transistor with a gain of 10.0 or 50.0 is being utilized. Therefore, since the base current is a function of the collector current divided by the gain of transistor 72, it is seen that the base current must change if a transistor 72 of different gain value is to be used and function properly in self-regulating, no load protected electronic ballast system 10. Where the base current changes, then an electronic element in the base circuit must change its impedance value which is the function of self-regulating circuit 17 and primary first winding 55 of toroidal transformer 56.

In order to achieve self-regulation, the design of toroidal transformer 56 is such that the maximum permeability of core 27 is reached with a transistor whose gain is at a maximum expected value. Likewise, the inductance of first winding 55 of toroidal transformer 56 will therefore be at a maximum and hence a minimum current will flow through the base circuit for transistor 72.

The impedance of a winding having a magnetic core is related to the number of turns of the winding and current flowing therethrough, as well as inversely to the length of the magnetic path in the core. The point of operation may be adjusted by either changing the size of the toroid or by inserting parallel resistor 51 in parallel relation with toroid first winding 55 for adjustment of the corresponding exciting field. A value of approximately 200 Ohms has been successfully used for parallel resistor 51.

Thus, with first winding 55 of toroidal transformer 56 being at a maximum value of inductance, its impedance is significantly larger than the impedance of base coupling capacitor 54 such that it is the controlling factor in limiting the current to base element 78 of transistor 72. With transistor 72 having a maximum gain value, little current is needed, and for example, if the gain or beta of transistor 72 is 50.0, then it is seen that the base current is 1/50th of the collector current.

However, the voltage induced in base drive winding 48 has been designed to turn "on" a transistor of lower gain and therefore, there is excess energy to be dissipated in the base circuit of transistor 72. The excess energy is stored in first winding 55 of toroidal transformer 56. This impedance of first winding 55 is primarily inductive as opposed to resistive, and there is little dissipation in the form of heat, and thus, there is provided an efficient means of dissipating the excess energy which is liberated when transistor 72 is in an "off" state.

In opposition, when a transistor of low gain is used in self-regulating, no load protected electronic ballast system 10, the base current obviously must increase and the permeability of core 27 of toroidal transformer 56 shifts in a downward direction to a lower value than would be measured for a high gain transistor and the inductance is less than was seen with a high gain transistor. Thus, the series impedance is reduced which allows a greater base current to flow and compensates for the low gain transistor 72 being used in system 10.

Hence, there is provided a variable inductance in first winding 55 of toroidal transformer 56 which is essentially the self-regulating element and allows sufficient base current to switch transistor 72 to an "on" state regardless of the gain or beta of transistor 72. In this manner, the output of self-regulating, no load protected electronic ballast system 10 remains relatively constant within ±3.0% margin when comparing one system to another with extreme efficiency and without unnecessary dissipation of excess heat. Thus, as has hereinbefore been described, there is provided a relatively simple and efficient means of self-regulation and no load protection for electronic ballast system 10 without the need to manually adjust component values for pre-selected electronic transistor devices within specific gain values.

As has been previously described, self-regulating, no load protected electronic ballast system 10 provides for switching network 13 which is feedback coupled to induction circuit 15 for establishing a regulated current. Switching network 13 includes self-regulation control circuitry 17 for maintaining the power output of gas discharge tube 66 at a predetermined and substantially constant value.

Regulation control circuit 17 further includes toroidal transformer 56 for providing a predetermined variable inductance for regulating a power output to gas discharge tube 66. Toroidal transformer 56 includes first toroidal transformer winding 55 and second toroidal transformer winding 57. Base coupling capacitor 54 is coupled on opposing ends thereof to toroidal transformer first winding 55 and induction circuit 15 for substantially blocking a direct current from resistor 53 which may only flow through base 78 to emitter 76. First toroidal transformer winding 55 of toroidal transformer 56 is connected on a first end to base coupling capacitor 54 and on the opposing end to return line 64.

As has been stated, toroidal transformer 56 provides for the predetermined variable inductance which regulates the power input to gas discharge tube 66. Such toroidal transformer 56 has a toroid core configuration of ferrite material for varying the inductance in first winding 55 responsive to a particular gain value of transistor 72. Both first and second windings 55 and 57 of toroidal transformer 56 have a predetermined number of turns as hereinbefore described, and are wound in a manner such that the respective magnetic flux of first and second windings 55 and 57 is additive within toroid core 27. In the manner as hereinbefore described, second winding 57 of toroidal transformer 56 couples a variable inductance control current signal to first winding 55 of toroidal transformer 56, responsive to a predetermined value of magnetic flux components in the toroidal core of toroidal transformer 56. Further, first winding 55 of toroidal transformer 56 couples a variable inductance control signal to the toroidal core of toroidal transformer 56.

Further, with tuned no load protection transformer 100 being series coupled to induction circuit 15 for preventing the generation of voltages above a predetermined value when gas discharge tube 66 is electrically removed from the circuit. The primary winding 125 of tuned no load protection transformer 100 forms a variable inductance which is inversely proportional to the magnitude of the power delivered to gas discharge tube 66.

The variable impedance seen in primary winding 125 is a function of the impedance reflected from the tuned output winding 160. That impedance being a function of the number of turns in winding 160, the parallel capacitance of tuning capacitor 130, the magnetic circuit length in the core of transformer 100, and the current in secondary winding 160 which is the load current of gas discharge tube 166. Thus, a change in load current as seen when the gas discharge tube is no longer in the circuit, effects the impedance of winding 160 and is reflected into the impedance of the primary winding 125.

By creating a variable inductance whose impedance is inversely proportional to the load current, a limited voltage can be generated by control of the collector current responsive to the load conditions.

Although this invention has been described in connection with specific forms and embodiments thereof, it will be appreciated that various modifications other than those discussed above may be resorted to without departing from the spirit or scope of the invention, for example, equivalent elements may be substituted for those specifically shown and described, certain features may be used independently of other features, and in certain cases, particular location of elements may be reversed or interposed, all without departing from the spirit or scope of the invention as defined in the appended claims.

What is claimed:

1. A self-regulating, no load protected electronic ballast system having a power source for actuating at least one gas discharge tube with a regulated current and limited voltage to maintain said gas discharge tube input and output power at predetermined values, comprising:

(a) filter means connected to said power source for (1) maintaining a substantially smooth direct current voltage signal, and (2) suppressing harmonic frequencies generated by said electronic ballast system;

(b) induction means coupled to said filter means and having a tapped primary winding providing an auto-transformer configuration for establishing the magnitude of said regulated current, said induction means having a trigger control winding for generating a control current, said induction means further including no-load protection means for generating a voltage across said gas discharge tube responsive to said regulated current and for maintaining said output voltage at a predetermined value when said gas discharge tube is decoupled from said electronic ballast system, said no-load protection means having a transformer with a primary winding coupled in series relation with said filter means and said tapped primary winding of said induction means, said transformer including a multiplicity of secondary windings, said primary winding forming a variable inductance for reducing said regulated current when said gas discharge tube is decoupled from said ballast system;

(c) switching means being feedback coupled to said induction means for establishing said regulated current, said switching means including regulation means for maintaining said power output of said gas discharge tube at a predetermined and substantially constant value, said regulation means including a toroidal transformer having (1) a first winding coupled in series relation with said trigger control winding and said switching means for modifying said control current, and, (2) a second winding coupled to said tapped primary winding of said induction means and said filter means in series relation for feedback to said first winding of said toroidal transformer.

2. The self-regulating, no load protected electronic ballast system as recited in claim 1 where said multiplicity of secondary windings includes a tuned high voltage output secondary winding and a pair of filament excitation windings, each of said filament excitation windings being coupled to respective filaments of said gas discharge tube.

3. The self-regulating, no load protected electronic ballast system as recited in claim 2 where said tuned high voltage secondary winding is coupled in parallel relation to both a tuning capacitor and said gas discharge tube, said tuned high voltage secondary winding generating said limited voltage for input to said gas discharge tube, said limited voltage being reduced responsive to said reduced regulated current when said gas discharge tube is decoupled from said electronic ballast system.

4. The self-regulating, no load protected electronic ballast system as recited in claim 3 where said transformer includes a core ferrite material for generating said voltage input to said gas discharge tube, said transformer core saturating when said power source rises above a predetermined value.

5. The self-regulating, no load protected electronic ballast system as recited in claim 1 where said switching means includes transistor means for cycling said regulated current, said transistor means including a base element, a collector element, and an emitter element coupled to said power source.

6. The self-regulating, no load protected electronic ballast system as recited in claim 5 where said toroidal transformer second winding is connected to said induction means tapped primary winding and said emitter element of said transmitter means in series relation each with respect to the other.

7. The self-regulating, no load protected electronic ballast system as recited in claim 5 where said regulation means is coupled to said induction means and said transistor means in series relation.

8. The self-regulating, no load protected electronic ballast system as recited in claim 7 where said toroidal transformer provides a predetermined variable inductance for regulating a power output to said gas discharge tube, said toroidal transformer having a first toroidal transformer winding and a second toroidal transformer winding.

9. The self-regulating, no load protected electronic ballast system as recited in claim 6 where said regulation means includes a base coupling capacitor connected on opposing ends thereof to said toroidal transformer first winding and said trigger control winding of said induction means for substantially blocking a direct current component signal.

10. The self-regulating, no load protected electronic ballast system as recited in claim 4 where said regulation means includes a current limiting resistor coupled on opposing ends thereof in parallel relation with said toroidal transformer first winding and said emitter element of said transistor means.

11. The self-regulating, no load protected electronic ballast system as recited in claim 6 where said current limiting resistor limits a current value input to said base element of said transistor means when said toroidal transformer first winding inductance is at a substantially minimum value.

12. The self-regulating, no load protected electronic ballast system as recited in claim 5 where said trigger control winding of said induction means generates a switching control signal, said trigger control winding being coupled to said base coupling capacitor on a first end and to said base element of said transistor means on a second end thereof.

13. The self-regulating, no load protected electronic ballast system as recited in claim 12 where said induction means includes a capacitor in series relation to said tapped primary winding and said power source on opposing ends thereof, said capacitor for discharging energy, stored in said induction means during a first half of said regulated current cycle, during a second half of said regulated current cycle.

14. The self-regulating, no load protected electronic ballast system as recited in claim 13 where said tap of said primary winding is coupled to said collector element of said transistor means.

15. The self-regulating, no load protected electronic ballast system as recited in claim 8 where said toroidal transformer of said regulation means provides a predetermined variable inductance to regulate said power input to said gas discharge tube.

16. The self-regulating, no load protected electronic ballast system as recited in claim 15 where said toroidal transformer includes a toroid core configuration of ferrite material for varying the inductance in said first winding of said toroidal transformer responsive to a particular gain value of said transistor means.

17. The self-regulating, no load protected electronic ballast system as recited in claim 15 where said first and second toroidal transformer windings each of which having a predetermined number of turns are wound in a manner that the respective magnetic flux of said first and second toroidal transformer windings is additive within said toroid core, said first and second winding magnetic fluxes being generated by said base element current and said collector element current.

18. The self-regulating, no load protected electronic ballast system as recited in claim 16 where said first winding of said toroidal transformer has a greater number of turns than said second winding of said toroidal transformer.

19. The self-regulating, no load protected electronic ballast system as recited in claim 15 where said second winding of said toroidal transformer couples a variable inductance control current signal to said first winding of said toroidal transformer responsive to a predetermined value of a magnetic flux component in said toroidal core of said toroidal transformer.

20. The self-regulating, no load protected electronic ballast system as recited in claim 19 where said first winding of said toroidal transformer couples a variable inductance control current signal to said toroidal core of said toroidal transformer.

21. The self-regulating, no load protected electronic ballast system as recited in claim 1, said filter means includes:
 (a) harmonic filter means for substantially reducing harmonic frequencies generated by said induction means; and,
 (b) smoothing filter means coupled in parallel relation to said harmonic filter means for maintaining said substantially smooth direct current voltage signal, said smoothing filter means including a rectification means for providing full wave rectification of said power source AC voltage.

22. The self-regulating, no load protected electronic ballast system as recited in claim 21 where said smoothing filter means includes a series inductor coupled in series relation to said power source and said rectification means.

23. The self-regulating, no load protected electronic ballast system as recited in claim 22 where said smoothing filter means includes a shunt capacitor coupled to said rectification means and said power source, said shunt capacitor being coupled in parallel relation with an output of said filter means.

24. The self-regulating, no load protected electronic ballast system as recited in claim 23 where said harmonic filter means includes a harmonic filter capacitor, said harmonic filter capacitor being coupled to said series inductor and said power source.

25. The self-regulating, no load protected electronic ballast system as recited in claim 5 where said switching means includes a diode coupled in parallel relation to said transistor base element and said emitter.

26. The self-regulating, no load protected electronic ballast system as recited in claim 25 where said switching means diode includes a polarity opposite to a polarity of a junction of said transistor base element and transistor emitter element.

27. The self-regulating, no load protected electronic ballast system as recited in claim 1 where said power source is an AC power source.

28. The self-regulating, no load protected electronic ballast system as recited in claim 21 where said rectification means includes a full wave bridge circuit.

29. A no load over voltage protection circuit including a tuned transformer series coupled to a current driven inverter circuit for preventing the generation of voltages above a predetermined value, said current driven inverter having a transformer through which inverter current is switched to deliver power to a load, said tuned transformer having a primary winding and at least one secondary winding, said primary winding being series coupled to said inverter circuit transformer through which said inverter current is switched, said primary winding forms a variable inductance which is inversely proportional to the magnitude of said power delivered to said load.

30. The no load over voltage protection circuit as recited in claim 29 where said secondary winding includes a tuning capacitor forming an inductive-capacitive tank circuit for generating said power to said load responsive to said switched inverter current.

31. The no load over voltage protection circuit as recited in claim 30 where said tank circuit is coupled in parallel relation to said load for coupling said generated power to said load, said load forming part of a complex impedance in combination with said tank circuit.

32. The no load over voltage protection circuit as recited in claim 31 where said complex impedance is reflected in said primary winding of said tuned transformer for control of said switched inverter current by said variable inductance of said primary winding.

* * * * *